United States Patent
Miller

(10) Patent No.: US 7,891,287 B2
(45) Date of Patent: Feb. 22, 2011

(54) COFFEE MAKER SUITABLE FOR AIRCRAFT USE

(75) Inventor: Paul Eugene Miller, Long Beach, CA (US)

(73) Assignee: MAG Aerospace Industries, Inc., Carson, CA (US)

(*) Notice: Subject to any disclaimer, the term of this patent is extended or adjusted under 35 U.S.C. 154(b) by 1445 days.

(21) Appl. No.: 10/869,496

(22) Filed: Jun. 16, 2004

(65) Prior Publication Data

US 2005/0279216 A1    Dec. 22, 2005

(51) Int. Cl.
    *A47J 31/00*    (2006.01)
(52) U.S. Cl. .................... 99/300; 99/302 R; 99/282; 99/283
(58) Field of Classification Search ............... 99/302 R, 99/283, 282, 300
    See application file for complete search history.

(56) References Cited

U.S. PATENT DOCUMENTS

| | | | |
|---|---|---|---|
| 3,596,588 A * | 8/1971 | Moss ........................ 99/282 |
| 4,478,139 A | 10/1984 | Zimmerman | |
| 4,757,923 A | 7/1988 | Stone, Jr. | |
| 4,949,627 A * | 8/1990 | Nordskog .................... 99/281 |
| 4,966,070 A * | 10/1990 | Frisch ...................... 99/302 R |
| 5,480,054 A | 1/1996 | Midden | |
| 5,647,269 A | 7/1997 | Miller et al. | |
| 5,676,040 A * | 10/1997 | Ford .......................... 99/280 |
| 5,687,635 A | 11/1997 | Stockton et al. | |
| 5,738,001 A | 4/1998 | Liverani | |
| 5,778,765 A * | 7/1998 | Klawuhn et al. ............. 99/290 |
| 6,047,630 A | 4/2000 | Brown et al. | |
| 6,050,175 A | 4/2000 | Mirand et al. | |
| 6,227,101 B1 | 5/2001 | Rabadi et al. | |
| 6,234,364 B1 | 5/2001 | Nybakke et al. | |
| 6,634,279 B2 * | 10/2003 | D'Antonio et al. ............ 99/285 |
| 6,705,208 B2 * | 3/2004 | Lassota ....................... 99/280 |
| 6,779,435 B1 * | 8/2004 | Iacobucci ................. 99/302 R |
| 2004/0079237 A1 | 4/2004 | Denisart | |
| 2004/0149032 A1 * | 8/2004 | Sell ........................... 73/304 C |

FOREIGN PATENT DOCUMENTS

| | | |
|---|---|---|
| EP | 0 771 542 A1 | 5/1997 |
| JP | 57128116 | 8/1982 |
| JP | 03198820 | 8/1991 |
| JP | 05005482 | 1/1993 |

(Continued)

OTHER PUBLICATIONS

WO 02/100227 Brouwer Dec. 2002.*

(Continued)

*Primary Examiner*—Reginald L Alexander
(74) *Attorney, Agent, or Firm*—Dean W. Russell; Kilpatrick Townsend & Stockton LLP

(57) ABSTRACT

A coffee maker assembly particularly suitable for aircraft use delivers hot coffee into a decanter that can be removed from the assembly to serve the coffee to passengers and crew inside an aircraft cabin. The assembly includes an electronically controlled solenoid valve that controls the delivery of water from a reservoir into a coil heater. Electronic circuitry in the system controls the assembly's operation and provides various indications to a user of the system. Various automatic valves, couplings, and other features ensure safe and reliable operation with minimal maintenance.

16 Claims, 13 Drawing Sheets

FOREIGN PATENT DOCUMENTS

| | | |
|---|---|---|
| JP | 05337051 | 12/1993 |
| JP | 10026412 | 1/1998 |
| JP | 2002068386 | 3/2002 |
| JP | 2003024703 | 1/2003 |
| JP | 2003038354 | 2/2003 |
| JP | 2003111676 | 4/2003 |
| JP | 2004538441 | 12/2004 |

OTHER PUBLICATIONS

Office Action dated Aug. 3, 2010 issued by the Japan Patent Office in related Application No. 2001-516587 and its English-language translation.

* cited by examiner

COFFEE MAKER SUITABLE FOR AIRCRAFT USE

BACKGROUND OF THE INVENTION

The invention relates generally to electrical equipment for use on aircraft, and more particularly, to electrical coffee maker systems for use in aircraft galleys.

Passenger aircraft fly routinely across oceans and continents. Passengers and crew spend several hours and more on board those aircraft. Passenger and crew comfort and efficiency depend to a great degree on the availability of hot food and beverages in flight, and passenger aircraft routinely include galleys and similar preparation areas for such food and beverages.

Many people enjoy hot coffee; for some it's a near necessity. Aircraft galleys have thus for some time included coffee maker systems designed to brew and dispense coffee to passengers and crew. Such existing coffee maker systems are typically less than ideal, though, for a variety of reasons.

Many such prior art systems are little changed from systems used on the ground in fixed installations. Brewed coffee drips into an open-topped pot placed under a dispenser. Such pots are sometimes not fixed in place, though, which creates an obvious spillage hazard, e.g., if someone bumps against the pot in the crowded aircraft galley or if the aircraft encounters turbulence or other motions that might cause coffee to spill out of the pot.

Some such open pot systems include apparatus for fixing their coffee pots in place while the coffee is being dispensed into them. When the coffee is in the pot, the pot can then be removed from the coffee maker so that the coffee can be served out to the passengers and crew. Such open pot systems are still less than ideal, though, because coffee can spill out of the pots' open tops either while the pots are in place in the coffee maker or while the pots are being moved around the cabin.

Other systems for brewing coffee on board aircraft include sealed pressure vessels or the like. Water is heated inside these pressure vessels and dispensed as coffee into pots for service. Such pressure vessel systems tend to be heavy and bulky, though, which is particularly disadvantageous on board aircraft, where any added weight leads directly to increased fuel consumption and thereby to increased operating costs. Pressure vessel systems can also present explosion hazards, and reliable mechanisms must be provided to vent pressure safely to prevent overpressure conditions inside the pressure vessels. Pressure vessel systems thus tend to be heavy and complex, expensive to operate, and difficult to maintain.

Other known systems require frequent and difficult maintenance. This makes such systems unreliable, and much time and expense can be involved in keeping these systems in reliable operation. A poorly designed or maintained system can ground even a multi-engine jumbo jet while one of its coffee makers is being serviced. This is a very expensive way to serve coffee.

It would be desirable, therefore, if new coffee maker systems could be developed in which coffee is dispensed into serving pots or the like through closed lids with very limited openings. Those pots should also be fixed into the coffee makers for added safety. Such systems, should, if possible, avoid the weight, expense, and reliability problems of known pressure vessel systems. A new onboard coffee maker system should be reliable and easy to maintain without taking airplanes out of service for frequent and extended maintenance. Lastly, a new aircraft coffee maker should be easy to use, and should produce good coffee the people will enjoy drinking.

This document describes novel coffee maker assemblies that provide these and other advantages.

SUMMARY OF THE INVENTION

The invention provides a coffee maker assembly particularly suitable for use in aircraft galleys. A particular embodiment of the invention includes a flow control valve for controlling the flow of water out of a water supply reservoir and into a heater element. Hot water is received from the heater element and directed via a conduit into contact with ground coffee. Hot liquid coffee is produced thereby, and directed into a receptacle configured to receive and hold the coffee until it can be served. In a particular preferred embodiment the flow control valve is an electrically controlled solenoid valve controlled by electronic signals from a central system electrical controller.

Water filters can be provided in conduits between the flow control valve and other elements of the system, to protect the flow control valve against particles suspended in the water flowing in the system.

In preferred embodiments, the receptacle configured to receive and hold the hot liquid coffee is a decanter that is configured to be received and releasably held by structure of the assembly, so that the decanter is held securely and is thus less likely to spill inside the aircraft.

In a particular preferred embodiment, first and second capacitive elements are mounted to a lid the closes the decanter. These elements are coupled to electrical circuitry operable to detect a change in capacitance between the first and second capacitive elements. This occurs when the coffee reaches a predetermined level inside the decanter, at which point the system's electronic controller closes the flow control valve to end delivery of hot water through the system and coffee into the decanter.

A particular decanter receives coffee through a small opening in its lid. This lid includes an anti-spill valve which operates to close the lid opening when the decanter is tipped or the coffee reaches a level near the top of the decanter. This occurs when a floatable valve member moves or floats into contact with a valve seat fixed with respect to the lid's opening.

Methods are provided for monitoring water temperatures at points upstream and downstream of the heater element and a heater element temperature at a point some distance along the heater's flow path. The flow of water and the operation of the system can be controlled in response to these measured temperatures.

DESCRIPTION OF THE PREFERRED EMBODIMENTS

Figure 1:
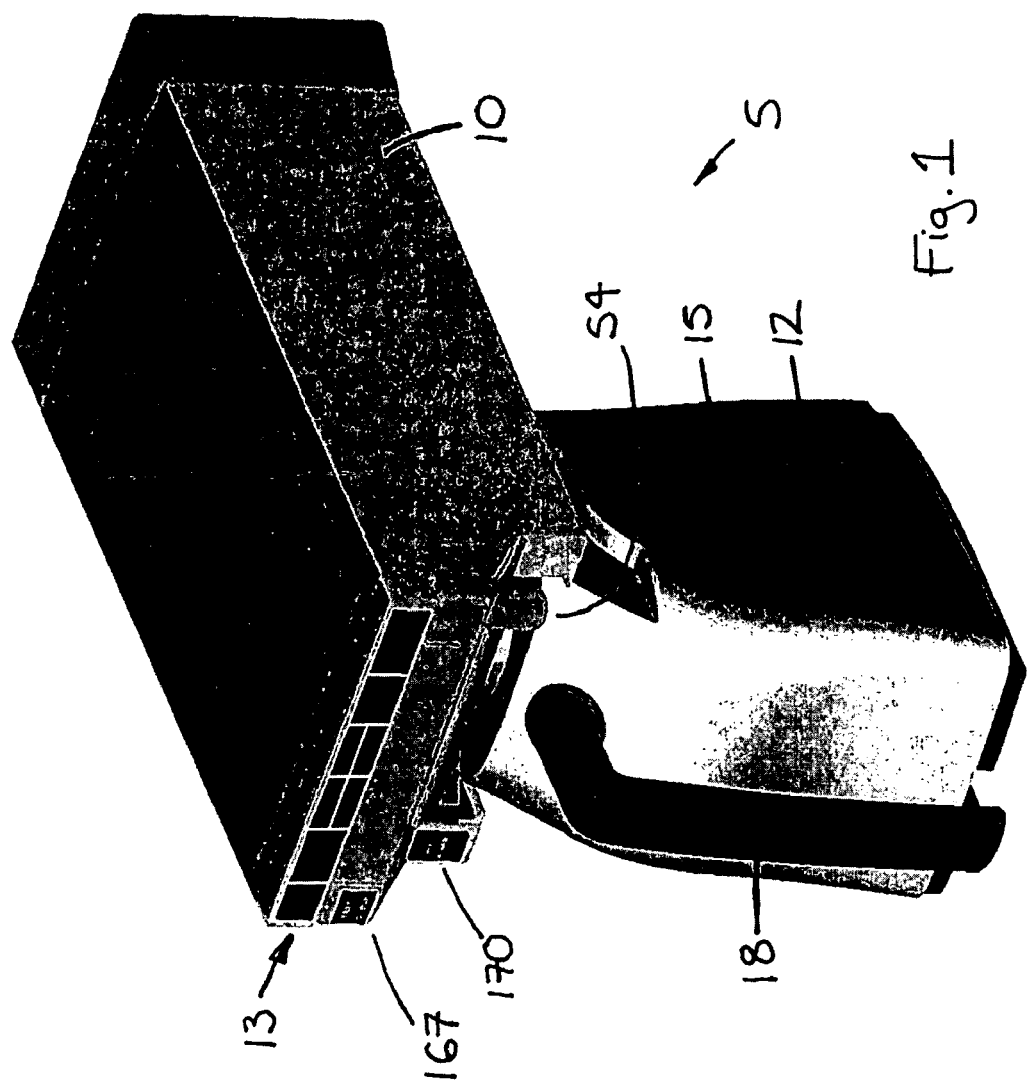
FIG. 1 is a perspective view of a coffee maker assembly according to the invention.

FIG. 1 is a perspective view illustrating a coffee maker assembly 5 that embodies the invention. The coffee maker assembly includes a coffee maker body assembly 10, which may be located, for example, inside an aircraft galley. A decanter 12 can be suspended from the coffee maker body assembly to receive hot coffee from the coffee maker and to hold it for later service to passengers and crew inside the aircraft. The coffee maker's operations are controlled by a control/indicator panel 13 on the front of the coffee maker body assembly.

Figure 2:
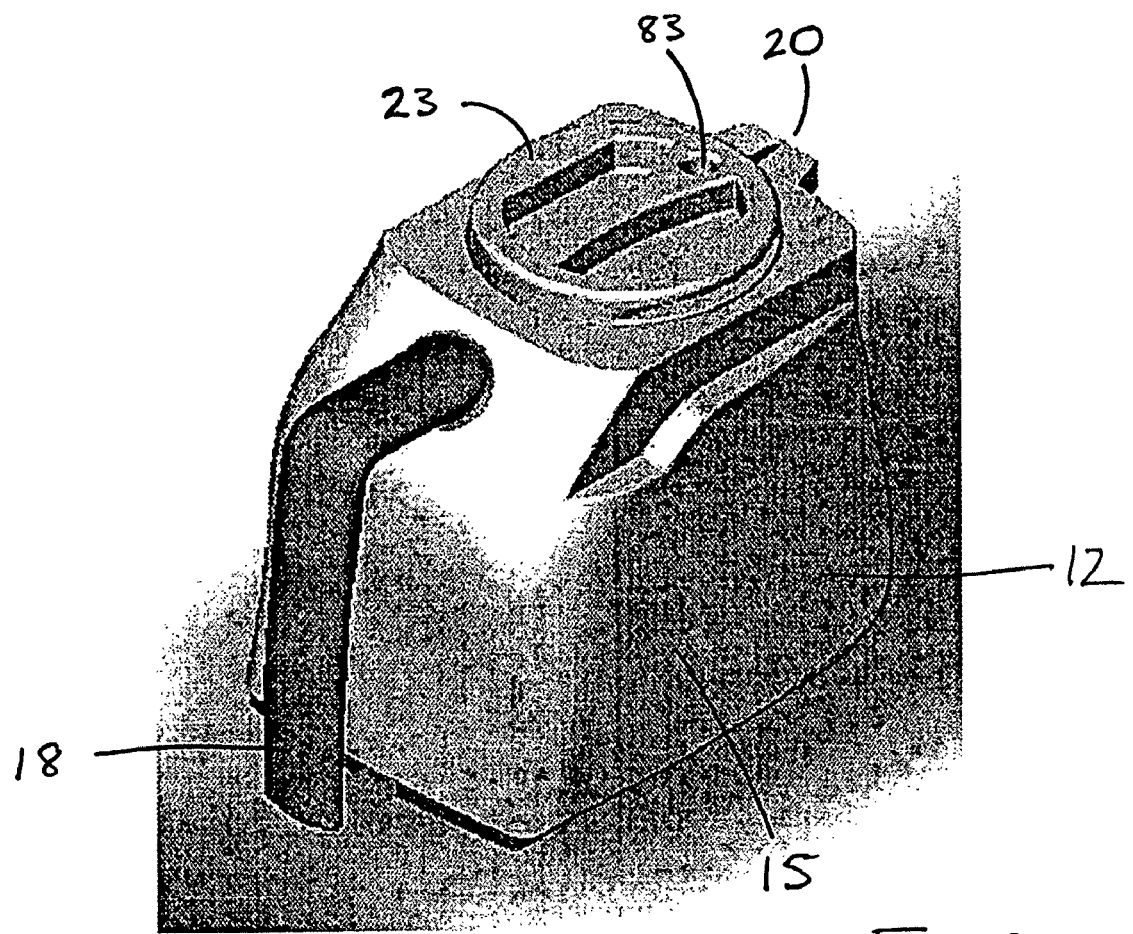
FIG. 2 is a perspective view of a coffee decanter and lid assembly for use in the coffee maker assembly of FIG. 1.

FIG. 2 shows the decanter 12 alone. The decanter includes a container body 15, which receives and holds the coffee. A decanter handle 18 is attached to one side of the container body, with a pour spout 20 at the side opposite the handle. A decanter lid 23 closes an opening in the top of the decanter body.

The decanter can be one of a variety of commercially available, industry-standard in-flight service decanters. As will be described further below, a custom lid is applied to the decanter. The lid serves as the mounting element and interface between the decanter and the rest of the coffee maker, so that any of a variety of decanters can be used, so long as an appropriate lid is developed and fitted to it.

Figure 3:
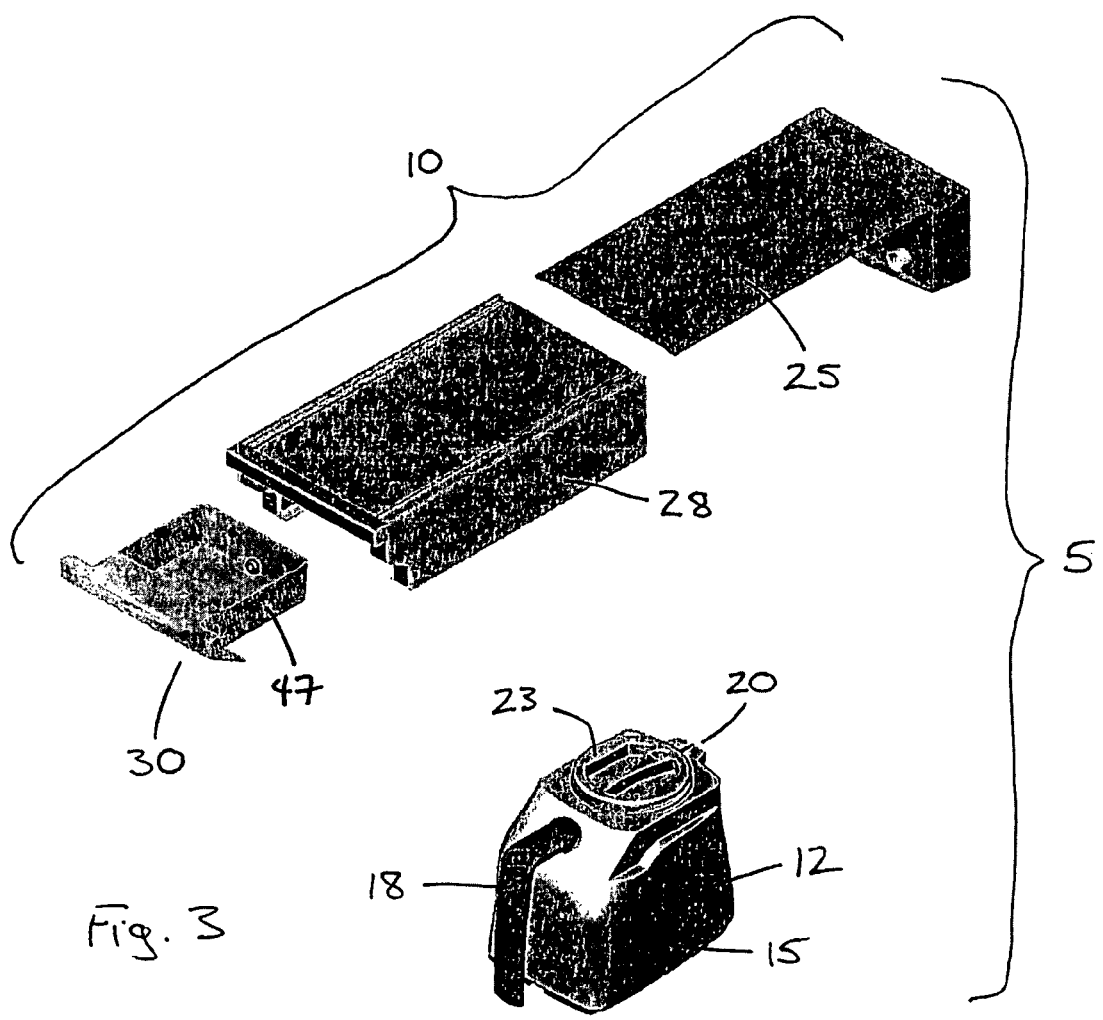
FIG. 3 is an exploded view showing the major components of the coffee maker assembly of FIG. 1.

FIG. 3 is an exploded view illustrating the major components of the coffee maker assembly 5. In particular, the coffee maker body assembly 10 includes a coffee maker rail 25, a control assembly 28, and a brew tray assembly 30. The coffee maker rail 25 mounts more or less permanently (i.e., tools are required to remove it) to a wall or similar structure inside the aircraft's galley, the control assembly 28 is received over and supported by the rail, and the brew tray assembly 30 slides into the control assembly.

Such a configuration is advantageous because it allows the working elements of the assembly, i.e., the control, indicator, and power circuitry and most of the fluid valves and internal plumbing, to be removed from the aircraft by simply removing the control assembly 28 from the coffee maker rail 25 (which can remain fixed inside the galley). A new control assembly can then be installed over the same rail. This allows for quick coffee maker changes (for routine maintenance or repair, for example) so that a multi-million dollar aircraft need never be grounded while one of its coffee makers is repaired.

Figure 4:
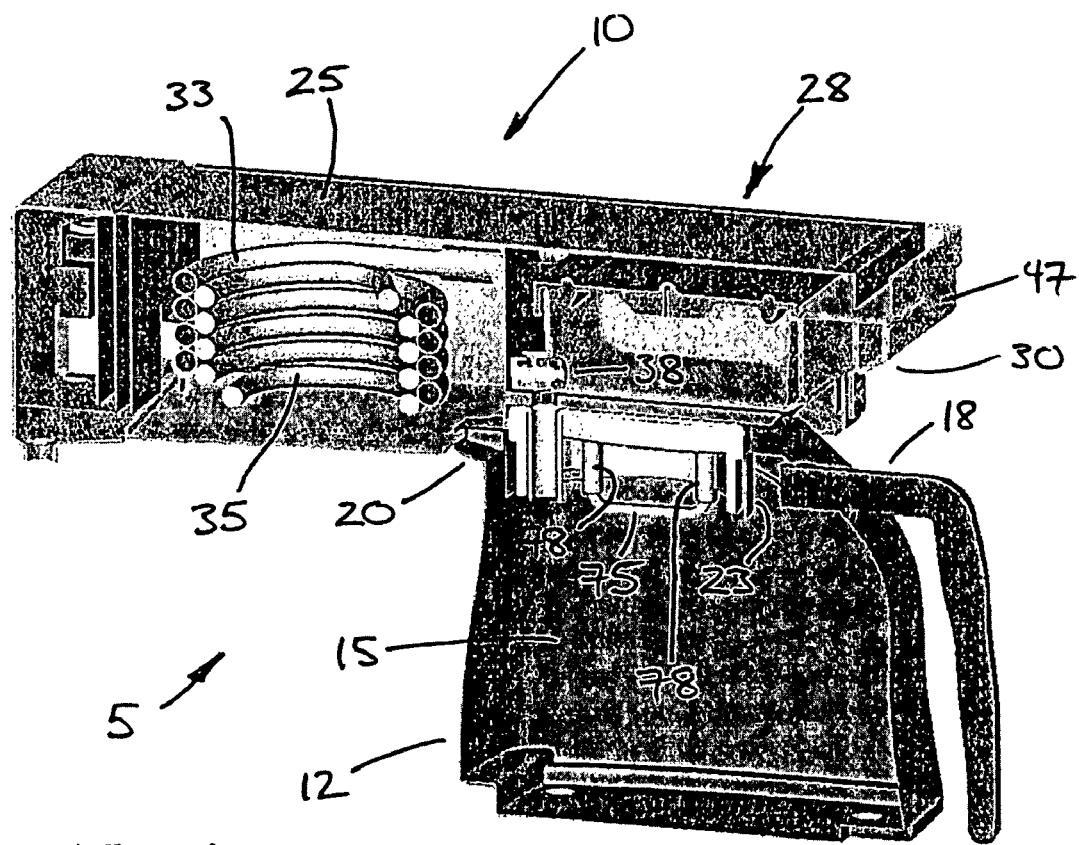
FIG. 4 is a cut-away view of the coffee maker assembly of FIGS. 1-3.

FIG. 4 is a section view illustrating the major internal components of the coffee maker assembly 5. In particular, the coffee maker body assembly 10 houses a helical water flow coil 33. A likewise helical electrical-resistance heating element 35 is nested inside and in close contact with the flow coil.

Water enters the flow coil 33 through flow control valves located toward the left side of FIG. 4. The water flows through the coils of the flow coil, and out of the flow coil (rightward in the drawing) into the brew tray assembly 30. The water flows inside the brew tray assembly, which holds a standard commercial coffee bag (not shown). The water flows into and through the coffee inside the bag. Brewed coffee exits the brew tray assembly through a brew tray outlet 38 near the bottom of the brew tray assembly. The brewed coffee then flows down through the lid 23 and into the container body 15 of the decanter 12.

The flow coil 33 and the heating element 35 are both made of copper or other good thermal conductors. The coffee maker's control system directs electrical current through the heating element. Electrical resistance generates heat in the heating element, which is transferred through the flow coil into water flowing through the coil. Water is heated in the flow coil at standard cabin pressure; no heavy or bulky pressure vessel is present or required.

Figure 5:
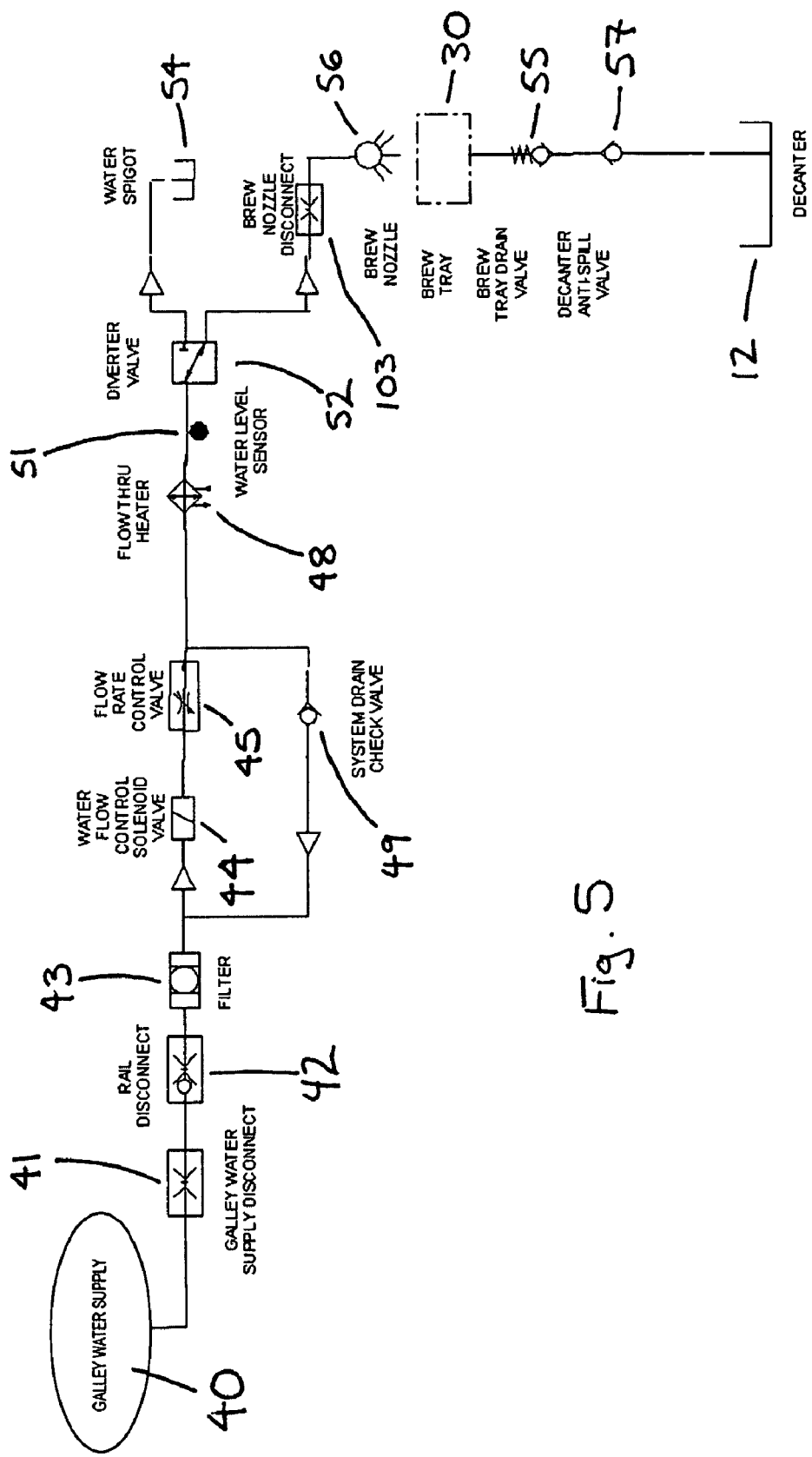
FIG. 5 is a schematic plumbing diagram illustrating the flow of water and coffee through the coffee maker assembly of FIGS. 1-4.

FIG. 5 is a schematic plumbing diagram illustrating fluid flow through the coffee maker assembly. Potable water is held inside an aircraft's on-board galley water supply reservoir 40. The overall coffee maker assembly is connected to the galley water supply reservoir through a galley water supply connection 41. The galley water supply connection allows the coffee maker assembly to be disconnected from the galley water supply if the coffee maker assembly is removed from the aircraft.

A rail water supply connection 42 connects the coffee maker assembly to the water supply line between the coffee maker rail 25 and the coffee maker control assembly 28 (see FIG. 3). The rail water supply connection 42 includes a self-closing valve that closes when the coffee maker control assembly 28 is removed from the rail 25. This valve keeps water from spilling from the galley water supply into the aircraft cabin when the control assembly is not in place on the rail.

Water flows from the galley water supply 40 through the connections 41 and 42 through a water filter 43. The water filter keeps particles suspended in the galley water supply from entering a pair of valves downstream of the water filter. A water flow control solenoid valve 44 opens and closes to control the flow of water from the supply into the coffee maker. A flow rate control valve 45 maintains a steady water flow rate regardless of fluctuations in the galley water supply pressure.

Water flows from these two valves 44 and 45 into a flow-through heater 48. The flow-through heater includes the flow coil 33 and the heating element 35 (see FIG. 4). Water flowing through the flow coil is heated as power is supplied to the heating element. Water can be drained from the heater 48 back into the galley water supply reservoir 40 through a system drain check valve 49.

A water level sensor 51 monitors the water level inside the heater 48. The coffee maker control system uses information from the water level sensor to prevent the heater from operating when the water level is low in the heater.

A diverter valve 52 directs water from the heater 48 to either a water spigot 54 or a coffee brew nozzle 56. The water spigot allows a user to withdraw hot or cold water from the coffee maker. The brew nozzle channels hot water into the coffee maker's brew tray assembly 30. The brew tray assembly provides a chamber for coffee grounds through which heated water will pass to create coffee. Water that enters the chamber and flows through ground coffee held inside a standard flow-through coffee bag. Brewed coffee leaves the chamber through a brew tray drain valve 55.

The brewed coffee leaving the brew tray assembly 30 through the brew tray drain valve 55 is directed into a decanter 12 through a decanter anti-spill valve 57. Brewed coffee can be held inside this decanter until the decanter is removed from the assembly so that the coffee can be served to the aircraft's passengers and crew.

Figure 6:
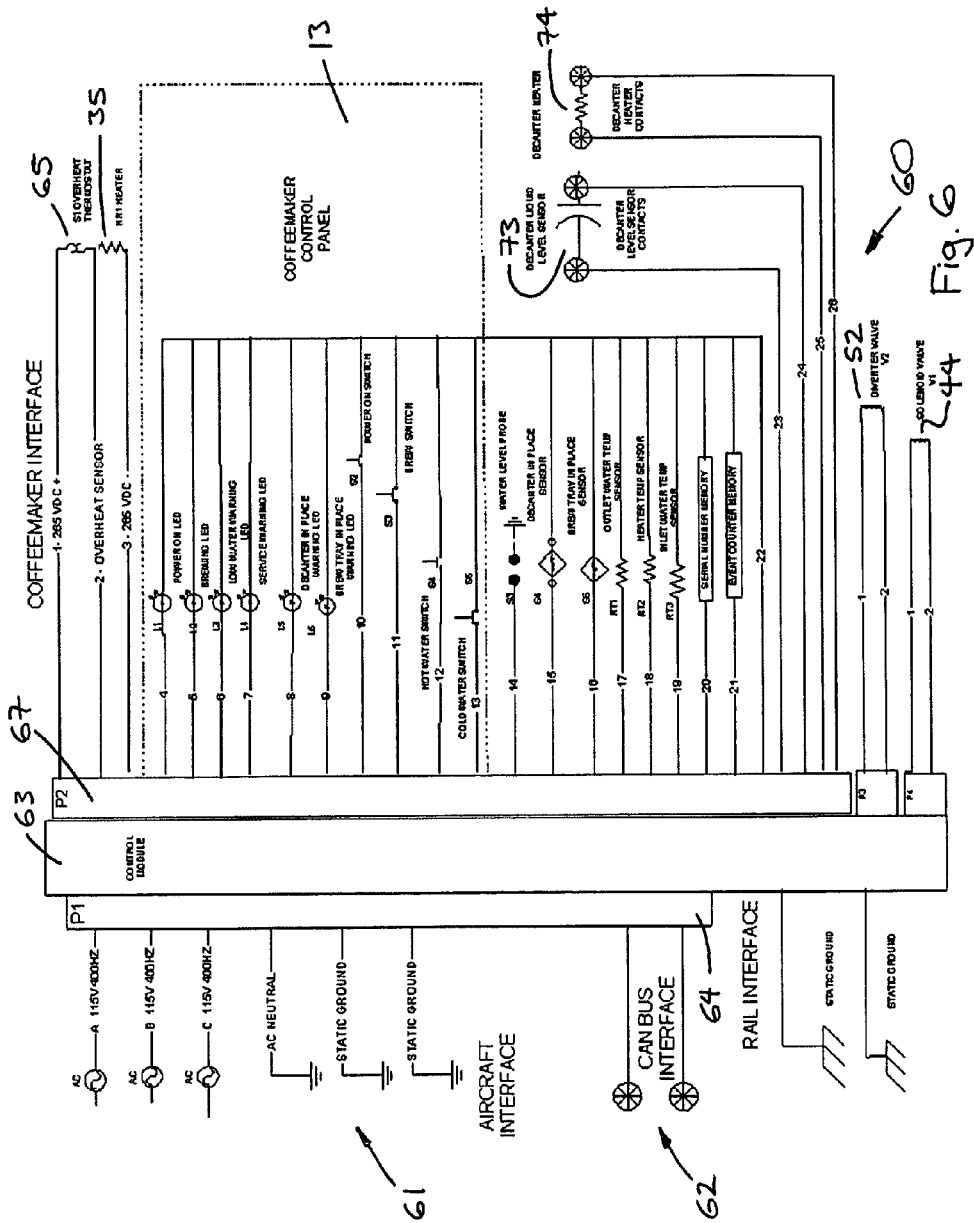
FIG. 6 is a schematic diagram of the electrical system of the coffee maker assembly of FIGS. 1-5.

FIG. 6 is a simplified schematic diagram of the coffee maker's electrical system 60. The coffee maker's operations are controlled by a central electrical controller 63, which receives three-phase, 115 volt, 400 Hz alternating current from the aircraft's on-board electrical power supply through an aircraft interface 61. The AC power is rectified and supplied as single-phase direct current to the coil heating element 35. The heating element is protected by a heating element thermostat 65. Power to the heating element is interrupted automatically if the heating element's temperature (as determined by the thermostat) exceeds a predetermined maximum allowable value.

The coffee maker's electrical controller 63 is connected to the aircraft interface 61 and the aircraft's CAN (controller area network) bus interface 62 via a rail interface 64, which joins the coffee maker's electrical controller 63 to the aircraft's systems when the coffee maker control assembly 28 is installed onto the coffee maker rail 25 (see FIG. 3).

The coffee maker's various systems, controls, and indicators are linked to the central electrical controller 63 through a multi-pin connector 67. The heating element 35 and the overheat thermostat 65 are connected as shown in FIG. 6 to pins 1, 2, and 3 of the multi-pin connector. Indicators and switches on the coffee maker's front side control panel 13 are connected to the controller 63 through pins 4-13, various other probes and sensors through pins 14-19, and two storage memories through pins 20 and 21. Pin 22 serves as a common ground or return for the elements connected to pins 4-21. Flow control solenoid valve 44 and diverter valve 52 (see FIG. 5) each connect to the central electrical controller 63 through their own individual connectors.

The electrical system 60 of FIG. 6 includes several sensors that operate to prevent mishaps and to ensure proper operation of the coffee maker assembly. As noted above, a water level sensor 51 monitors the level of water inside the flow through heater 48 (see FIG. 5). If insufficient water is present in the coil, the system controller will prevent power delivery to the heating coil 35 to avoid boiling the flow coil dry or otherwise overheating the unit. If this should occur, a low water warning light emitting diode ("LED") is illuminated on the coffee maker's control panel 13. (The low water warning LED is shown connected to pin number 7 of the multi-pin connecter 67 in FIG. 6; the water level sensor to pin number 14.)

The heating element overheat thermostat 65 also acts to protect the heater 35 from over heating. This thermostat will interrupt the supply of power to the heater even if the controller 63 fails or is otherwise unable to prevent overheating in the heater coil 35.

A "decanter-in-place" sensor is shown connected to pin 15 of the multi-pin connector 67. This sensor determines whether a decanter 12 is properly in place in the coffee maker. If the decanter is missing, the water control solenoid valve 44 is closed to prevent water draining through the flow coil 33 to spill into the aircraft galley. When this occurs, the controller 63 will light the "decanter-in-place" warning LED shown connected to pin 8.

A "brew-tray-in-place" sensor (shown connected to pin number 16 of the multi-pin connector 67) determines whether the system's brew tray is properly in place in the coffee maker. If the brew tray is partially open or removed from the assembly, as it would be, e.g., for the coffee bag to be changed, the solenoid valve 44 is likewise held closed to prevent hot water spilling into the galley. Such a condition will light the "brew-tray-in place" warning LED, which is shown connected to pin 9.

Three temperature sensors measure water temperatures in the vicinity of the flow coil 33. A flow coil inlet water temperature sensor (shown connected to pin number 19 of the multi-pin connector 67 in FIG. 6) measures the temperature of the as yet unheated water flowing into the upstream side of the flow coil. A second, mid-flow coil temperature sensor (shown connected to pin number 18) measures the temperature of the heater coil or sheath at a point near the mid-point of the water's flow path through the coil. Finally, a third, flow coil outlet water temperature sensor (shown connected to pin number 17) measures the temperature of the heated water leaving the downstream side of the flow coil.

Storage memory can record and store data for identification, diagnostic, or other purposes. In FIG. 6, a serial number memory (shown connected to pin number 20) is present to record identifying information and maintenance records for a particular coffee maker assembly. An event counter memory (connected to pin number 21) logs the occurrence of predetermined events (e.g., system activation, brew tray or decanter removals, heating coil heating cycles, system fault conditions, etc.) that may be useful in determining whether the system is performing properly or in performing maintenance on the system.

To make coffee, a user places a fresh coffee bag in the brew tray, slides the brew tray into position, and makes sure a decanter is properly in place in the coffee maker. Activating an on/off switch (which is shown in FIG. 6 connected to pin number 10 of the electrical controller's multi-pin connector 67) supplies power to the control system. A power on LED (shown connected to pin 5) illuminates to signal the user that the unit is receiving power from the aircraft.

Activating a brew switch (connected to pin 11 of the multi-pin controller 67) starts a brew cycle. A brewing indicator LED (connected to pin 6) illuminates on the control panel 13 to confirm the brew cycle's initiation. Assuming the water level probe, decanter-in-place sensor, and brew-tray-in-place sensor all return their expected confirmations, the flow control solenoid valve 44 (see FIG. 5) opens to allow water to flow into the coil 33 (see FIG. 4) as power flows through the heating element 35.

Water heating is monitored by the three temperature sensors in the vicinity of the coil—the flow coil inlet water temperature sensor, the mid-flow heater coil temperature sensor, and the flow coil outlet water temperature sensor (see FIG. 6). The controller 63 uses information from these sensors to control power delivery to the heating coil and the flow of water through the flow coil.

Hot water enters the brew tray assembly 30 through the brew nozzle 56 (see FIG. 5). The hot water seeps through the ground coffee in the coffee bag inside the brew tray, and hot coffee leaves the bag and the brew tray through the brew tray drain valve 55. Hot coffee enters the decanter 12 through the decanter's own decanter anti-spill valve 57.

The three temperature sensors in the vicinity of the flow coil 33 allow for precise control of brewing and the collection of diagnostic information regarding the system's performance. In normal operation, power delivery to the heating element 35 is controlled to ensure the delivery of water at the proper temperature at the downstream end of the flow coil. The electrical controller can process readings from any or all of the three temperature sensors to adjust the power level applied to the heating element.

In some cases, the flow coil inlet water temperature sensor just upstream of the flow coil may detect an unusually low temperature, indicating unusually cold water in the galley water supply reservoir. Under such conditions, the heater may not be able to produce sufficient to heat the water fully to the desired temperature with the solenoid flow control valve 44 continuously open. In such a case, the electrical controller can pulse the flow control valve between its open and closed positions to limit the water's flow rate through the flow coil 33 so that the heater power is sufficient to heat the water fully to its proper temperature.

As another example, an unusually high temperature difference between the mid-coil heater sheath temperature sensor (located on the exterior of the flow coil near the mid-point of the flow path) and the flow coil outlet water temperature sensor may indicate an accumulation of heat-insulating calcium scale or a similar problem in the flow coil. In this case, the controller might cause a service warning LED on the assembly's control panel to illuminate. In some circumstances the controller might also shut down the unit until it can be serviced.

A decanter liquid level sensor 73 (shown connected to pins 23 and 24 of multi-pin connector 67 in FIG. 6) detects the presence of liquid at a level near the top of the decanter's lid. This signals the controller 63 to cease delivery of water to the flow coil. The flow control solenoid 44 closes, and the small amount of water remaining in the coil drains through the remainder of the system and into the decanter. The decanter liquid level sensor is low enough in the decanter so that the small amount of coffee that continues to flow into the decanter after the decanter liquid level sensor is first activated will not overflow the decanter. The decanter can then be removed from the system and the fresh-brewed coffee served out to the passengers and crew inside the aircraft.

An in-decanter coffee heating element 74 is connected to pins 25 and 26 of the multi-pin connector 67. The heating element can take a variety of forms. As an example, a resistive heating element can be provided in the walls or bottom of the decanter, with leads and contacts to conduct electrical current through the heating element. Such a heating element can allow coffee to be kept hot inside the decanter for extended periods before it is served.

Figure 7:
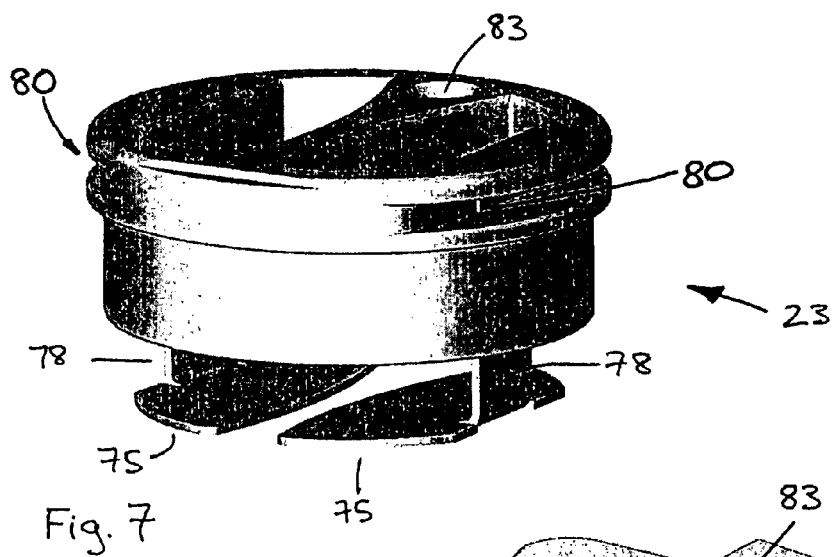
FIG. 7 is a perspective view of a lid suitable for use with the decanter of FIG. 2.

FIG. 7 is a perspective view of the decanter lid 23. A pair of electrically conductive (metal-plated or otherwise) capacitance plates 75 are suspended from the main body of the lid on substantially vertical plate supports 78. Each of the capacitance plates is in electrical contact via its plate support with an electrical contact surface 80, one such surface on either side of the lid.

These electrical contact surfaces are in contact with electrically-conductive mating contact surfaces in the coffee maker control assembly 28 (see FIG. 1). The mating contact surfaces are connected in turn to the system's electrical controller 63. (The contact surfaces are connected to contact pins numbered 23 and 24 in the multi-pin connector 67 shown in FIG. 6.) When the coffee inside the decanter 12 reaches the level of the plates 75, the electrical capacitance between the plates changes substantially, because at that point there is liquid (coffee) instead of air between the plates. This capacitance change is detected by the controller 63. The controller then closes the flow control valve 44 as described above to prevent the decanter's being overfilled.

Figure 8:
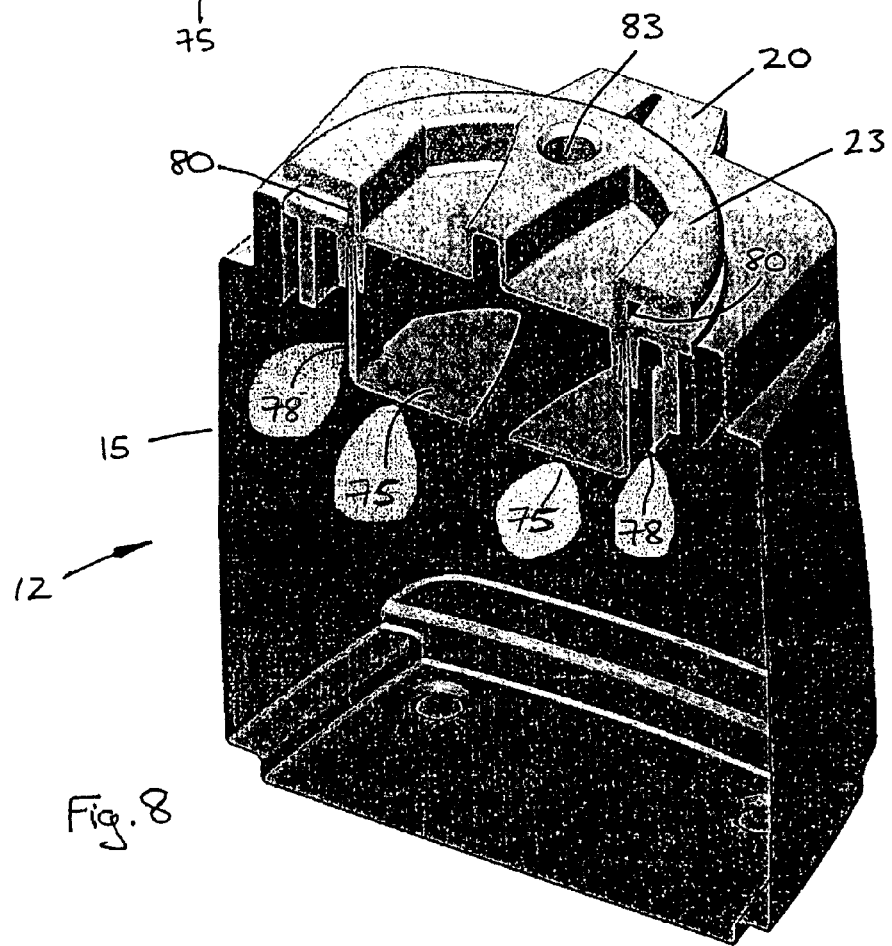
FIG. 8 is a cut-away view of the decanter and lid assembly of FIG. 2.

FIG. 8 is a section view showing the lid 23 in place on the decanter 12 and the position of the capacitance plates 75 inside the decanter's container body 15. As the drawing illustrates, the capacitance plates hang down some distance into the container body, which allows some overfill volume over the plates for receiving the small amount of excess coffee that drains out of the system after the coffee is first detected at the plates.

The lid 23 is rotatable on the decanter through three positions. In the first position, which is shown in FIG. 8, the lid is fixed (i.e., not removable) on the decanter with the spout opening closed. In the second position, the lid is likewise fixed on the decanter but the spout is open so that coffee can be poured. Finally, the third position allows the lid to be removed entirely from the decanter. The configuration of the lid is such that the decanter can be placed onto or removed from the assembly only when the lid is in the first position— the one in which the pour spout is closed. This helps to prevent spills when the decanter is taken from or replaced back on the coffee maker.

The configuration of the electrical contact surfaces 80 on either side of the lid is also advantageous because the mating contacts in the coffee maker slide across the contact surfaces every time the decanter is removed from or replaced into the coffee maker. This sliding contact wipes the contact surfaces against one another, which helps to clear any surface contamination from the contacts and to ensure reliable electrical contact and sensing between them. Similar electrical contacts can be provided conveniently here as well for the in-decanter heater that keeps coffee warm inside the decanter.

FIGS. 7 and 8 also illustrate the small opening 83 in the top of the lid 23. As noted above, hot coffee enters the decanter through this opening in the lid. The opening should be large enough to receive the flow of coffee leaving the brew tray without spilling coffee on the lid, but should otherwise be as small as reasonably practical.

In the embodiment shown in these figures, brewed coffee enters the decanter through an essentially closed lid. Making the opening small helps to trap and conserve heat inside the decanter, which keeps the coffee hot until it is served. In addition, the small opening will tend to keep coffee from spilling out of the decanter if the decanter is tipped over accidentally. The surface area of the opening in the lid should be less than one-third of the area of the upper surface (i.e., at the interface between the coffee and the air above it) of the coffee standing in the pot. The ratio of the surface area of the lid opening to the coffee's upper surface area should more preferably be less than 10%, and ideally less than 5%.

Figure 9:
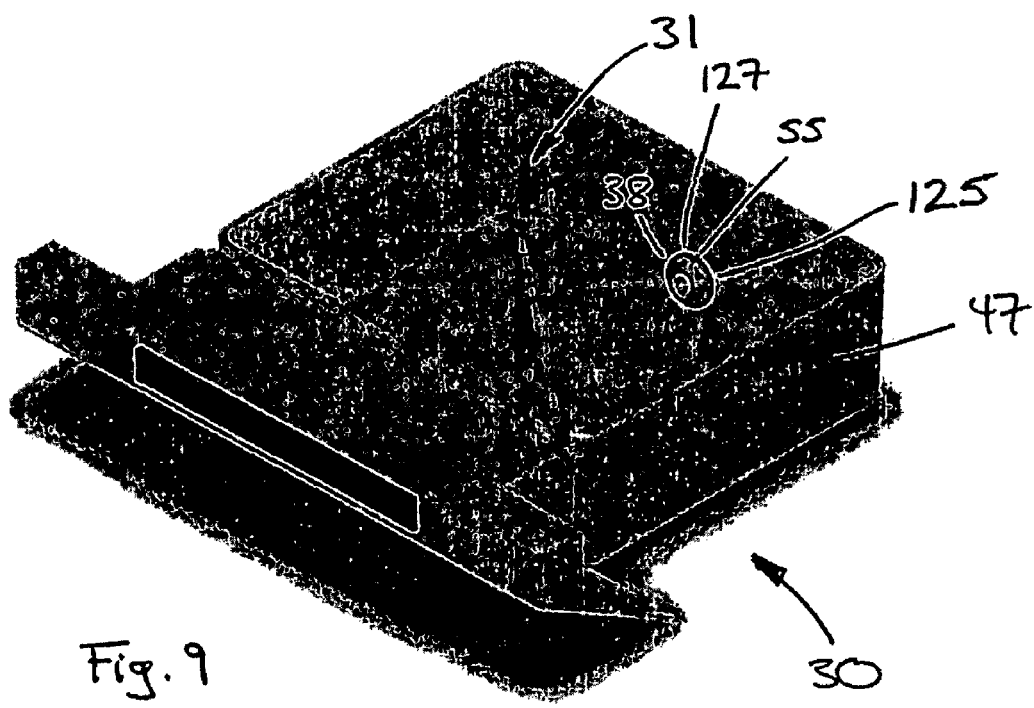
FIG. 9 is a perspective view of a coffee brew tray for use in the coffee maker assembly of FIGS. 1-8.

A brew tray assembly 30 is illustrated in FIG. 9. The assembly's brew tray 47 includes an interior space 31 sized to receive a standard, commercially available ground coffee bag. Water directed by the system into the brew tray is filtered through the bag material and the ground coffee as the hot water flows through the bag. This water leaves the brew tray as hot coffee through the brew tray outlet 38. The flow of hot coffee from the brew tray outlet is controlled by the brew tray drain valve 55, which is described in more detail below.

Figure 10:
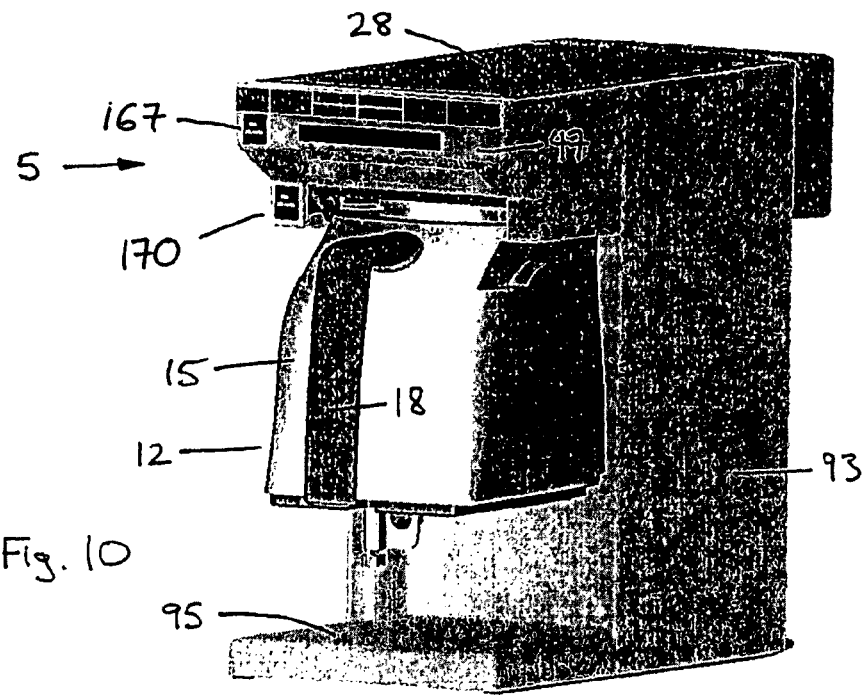
FIG. 10 is a perspective view of an alternative coffee maker assembly.

FIG. 10 is a perspective view of an alternative coffee maker assembly 5. This embodiment is similar in most respects to the embodiment described above. This embodiment, though, includes a pedestal 93 and a base 95 that support the coffee maker's control assembly 28 and brew tray assembly 30.

Figure 11:
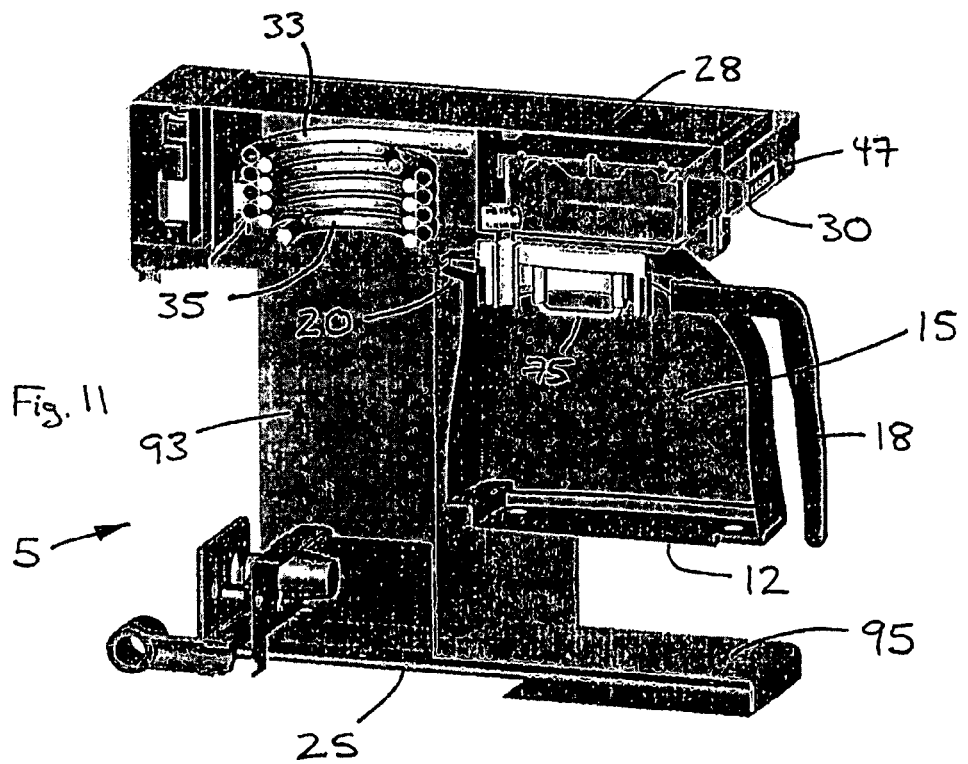
FIG. 11 is a cut-away view showing interior structures of the alternate embodiment of FIG. 10.

FIG. 11 is a cut-away view showing interior structures of the alternate embodiment of FIG. 10. As this figure illustrates, this embodiment is mounted on a coffee maker rail 25 that is located under the control assembly 28 and the decanter 12. As in the previous embodiment, the rail is mounted more-or-less permanently to structure inside the aircraft galley, and the rest of the coffee maker assembly slides over the rail.

Figure 12:
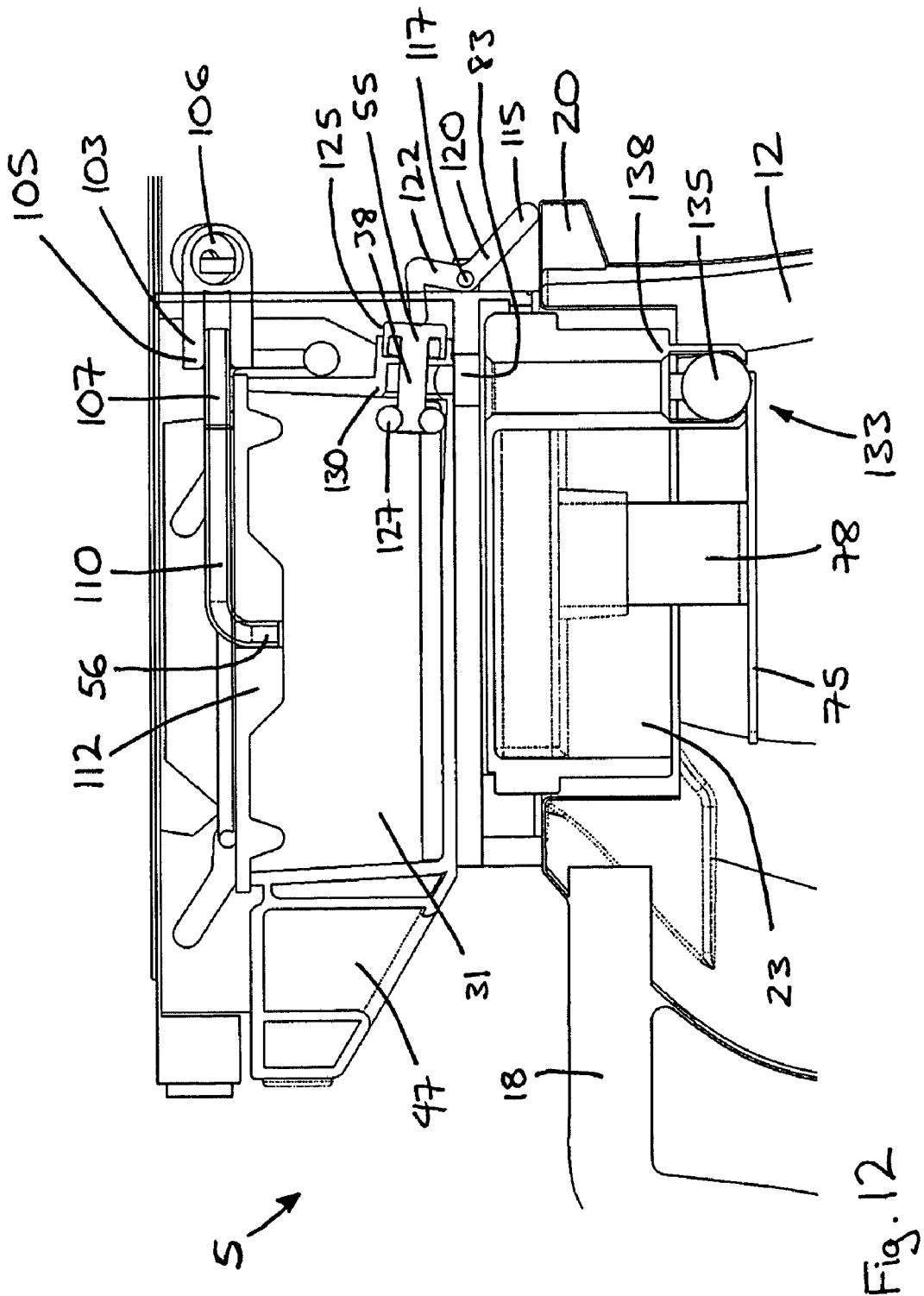
FIG. 12 is a side section view of the top of a decanter in place in the coffee maker assembly.

FIG. 12 is a side section view of the top of the decanter 12 in place in the coffee maker assembly 5. When coffee is brewed, hot water is directed from the diverter valve 52 into a brew nozzle disconnect 103 (see FIG. 5). The brew nozzle disconnect includes a brew nozzle connector 105 that includes a brew nozzle connector inlet 106 that receives hot water from the flow-through heater, as directed by the diverter valve. The female brew nozzle connector is coupled to a male brew water receiver 107. Water flows from the receiver through a brew nozzle supply tube 110 to the brew nozzle 56.

The brew nozzle 56 is formed in a movable brew nozzle plate 112. In this configuration, the brew nozzle plate presses down against a coffee bag held inside the interior space 31 of the brew tray 47. This insures that hot water from the brew nozzle is well-directed into the bag and through the coffee.

Brewed coffee leaves the bag and the brew tray 47 through the brew ray outlet 38 at the back of the brew tray. The brew tray outlet includes a brew tray drain valve 55. When the decanter 12 and the brew tray 47 are both in position as shown in FIG. 12, the brew tray drain valve is held open by a pivot lever 115, which turns about a pivot 117 fixed to the assembly.

The decanter's pour spout 20 presses against a first lever arm 120, which in turn presses the lever's second arm 122 against a spring-loaded brew tray drain valve body 125. This urges a seal 127 on the valve body away from a valve seat 130 around the brew tray outlet 38. The brew tray drain valve is thus opened to allow brewed coffee to exit the brew tray 47.

The coffee leaves the brew tray 47 and enters the decanter 12 through the fill hole opening 83 in the top of the decanter's lid 23. The coffee flows down through the lid and into the decanter past a decanter anti-spill valve 133. The anti-spill valve is normally open, with a floatable valve ball 135 in a down position away from the anti-spill valve's valve seat 138. The anti-spill valve 133 guards against spillage when the decanter 12 is removed from the coffee maker assembly and the coffee is being served. If the decanter tips over, the valve ball 135 will seat against the valve seat 138, preventing coffee from flowing out of the decanter through the fill hole 83 in the lid 23.

Figure 13:
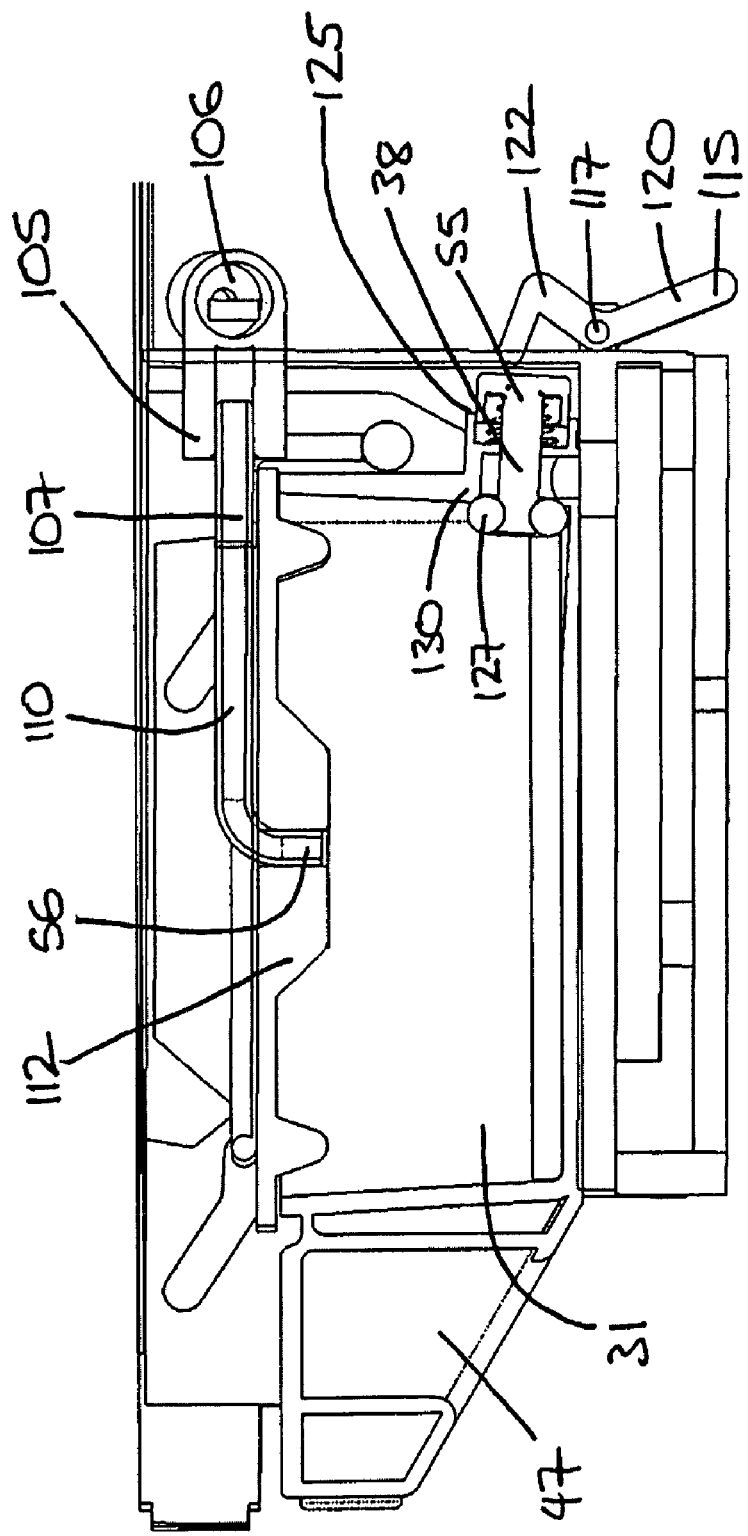
FIG. 13 is a side section view generally similar to that of FIG. 12, except that the decanter has been removed from the assembly.

FIG. 13 is a side section view generally similar to that of FIG. 12, except that the decanter has been removed from the assembly, as it would be, e.g., while coffee is being served to passengers and crew in the aircraft cabin. With the decanter out of the assembly, the decanter's spout no longer bears against the first arm 120 of the pivot lever 115. The pivot lever is free to pivot back around the pivot 117, and the second lever arm 122 applies no force against the valve body 125. The valve body's spring can thus urge the valve seal 127 into sealing contact with the valve seat 130 around the brew tray's outlet 38. This keeps any coffee remaining in the brew tray 47 from dripping out into the space vacated by the decanter and otherwise leaking into the galley.

A Hall effect sensor detects the position of a small magnet mounted on the pivot lever 115. The Hall effect sensor and the magnet function jointly as the "decanter in place" sensor shown connected to pin number 15 of the multi-pin connector 67 in the electrical schematic of FIG. 6. When the decanter is removed from the assembly, the Hall effect sensor detects this via the position of the magnet mounted on the lever, and the controller 63 closes the solenoid valve 44 to halt the flow of water through the flow through heater 48 and into the system (see FIGS. 5 and 6). The controller also illuminates the "decanter in place" warning LED shown connected to pin 8 of the multi-pin connector 67 to alert the user that the decanter is not mounted in its holder.

Figure 14:
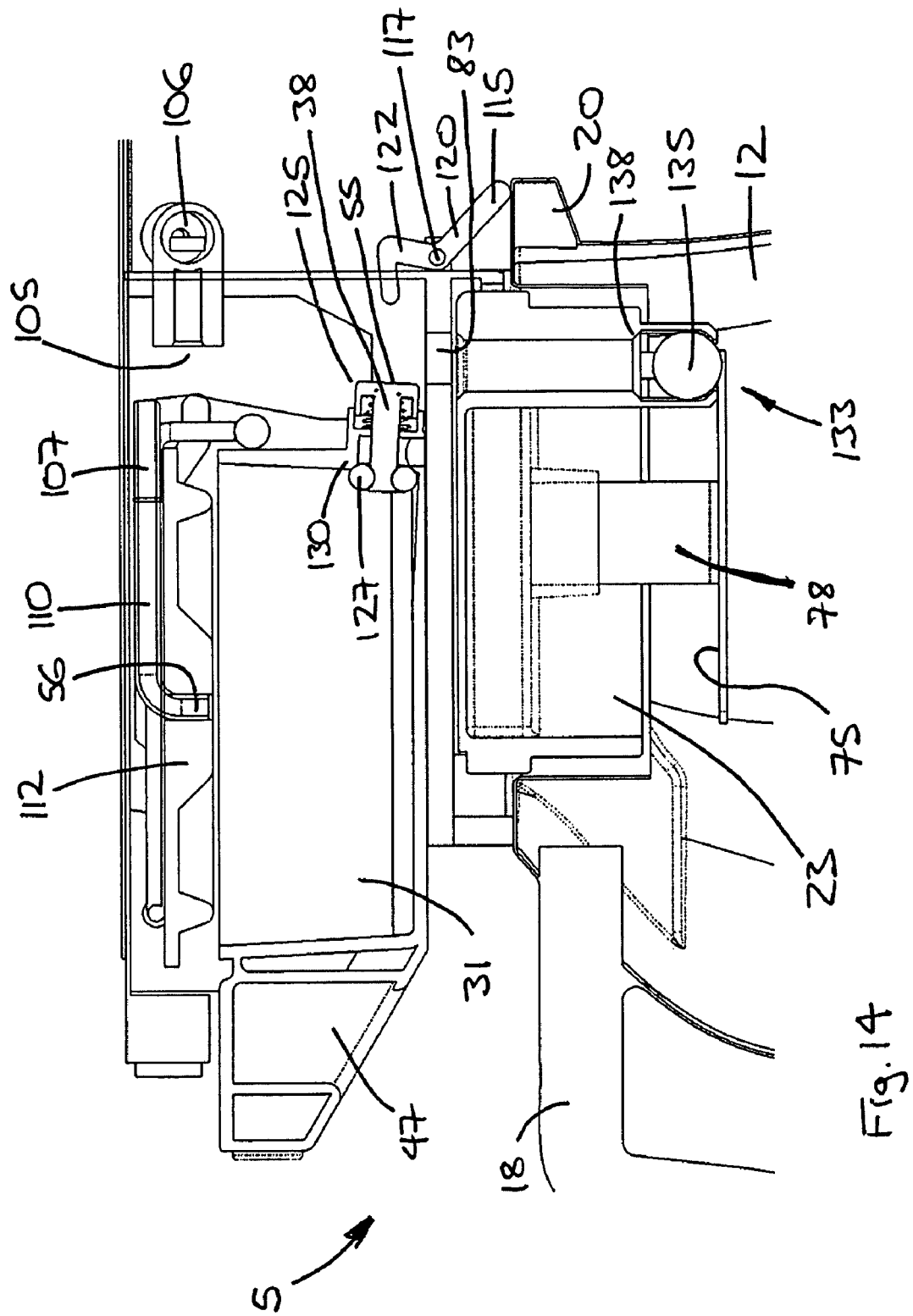
FIG. 14 is a side section view showing the assembly with the decanter in place but the brew tray partially removed.

FIG. 14 is a side section view showing the assembly 5 with the decanter 12 in place but the brew tray 47 partially removed. In this configuration the valve body 125 has moved away from the second arm 122 of the lever 115 so that no force is applied to the valve body by the lever. This allows the spring-loaded valve body to seal the brew tray outlet 38.

Moving the brew tray (toward the left in FIG. 14) out of the assembly also moves the brew nozzle plate 112 outward and upward, so that the male brew water receiver 107 decouples from the female brew nozzle connector 105. This protects against the release of steam or hot water directly into the space vacated by the brew tray 47 when the brew tray is removed from the assembly, e.g., to reload a new coffee bag for another brew cycle.

A magnet on the brew nozzle plate 112 or otherwise mounted to the brew injector system cooperates with a second Hall effect sensor to serve as the "brew tray in place" sensor shown connected to pin 16 of the multi-pin connector 67 shown in FIG. 6. When the brew tray is ejected from the assembly, the brew tray in place sensor signals the controller 63 to close the solenoid valve 44 to halt the flow of water into the system. At the same time, the "brew tray in place warning" LED shown connected to pin 9 in FIG. 6 illuminates to alert the user that the brew tray is partially ejected or wholly removed from the system.

Figure 15:
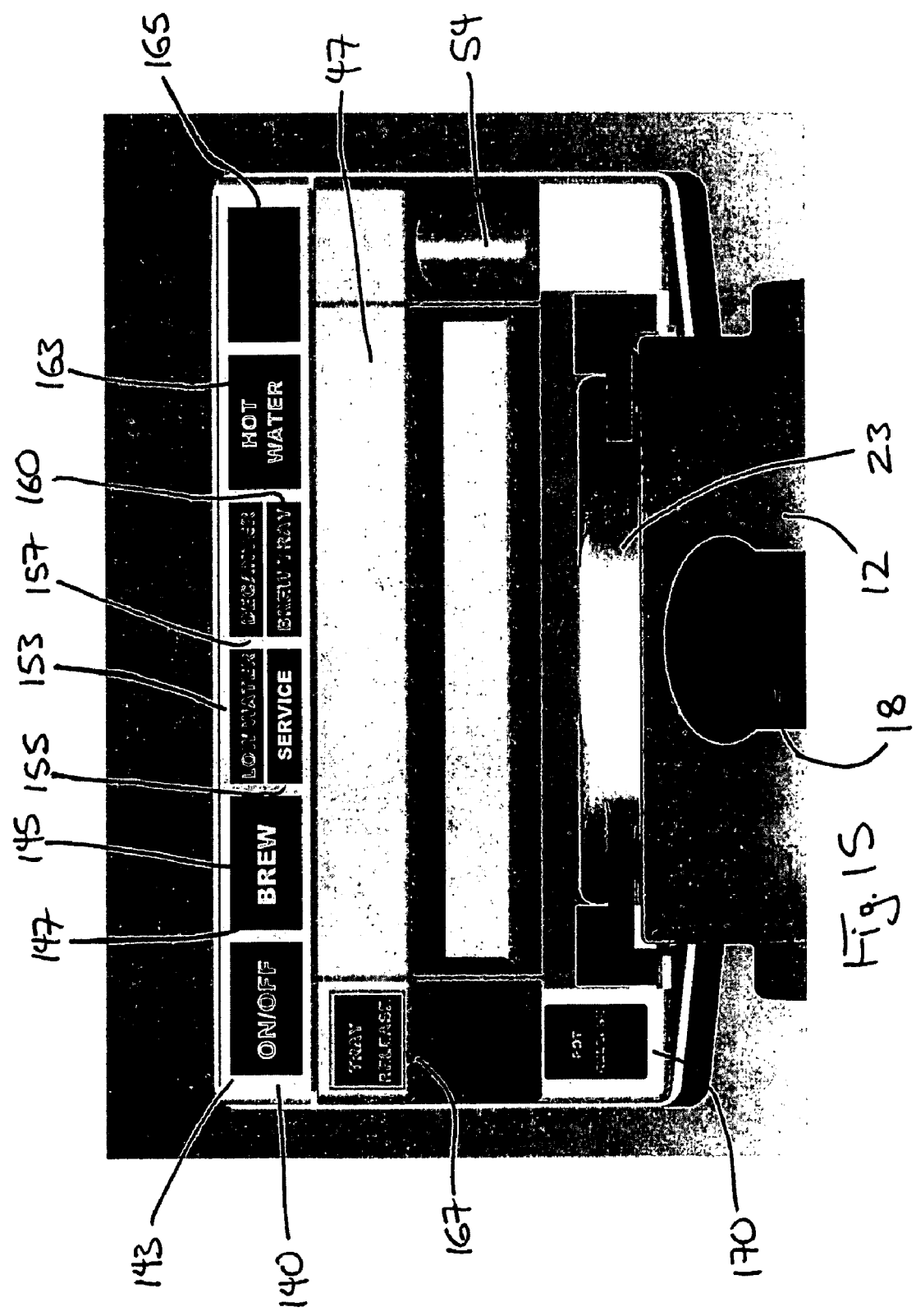
FIG. 15 shows details of the coffee maker's control/indicator panel.

FIG. 15 shows details of the coffee maker's control/indicator panel 13. An on/off pushbutton 140 controls the supply of power to the coffee maker. This on/off pushbutton is the "power on" switch shown connected to pin 10 of the multi-pin connector 67 in FIG. 6. The pushbutton switch is backlit by a "power on" LED 143 when the unit is turned on with power supplied to the unit. This LED is shown connected to pin 4 of FIG. 6.

Pressing a brew switch pushbutton 145 initiates a brewing cycle to start water flowing through the system. The brew switch pushbutton is shown connected to pin 11 in FIG. 6. A "brewing" LED 147 back lights the brew switch pushbutton when water is flowing through the system and coffee is being brewed. The controller 63 signals the brewing indicator LED to flash when the brew cycle is complete and the coffee is ready or when a brew cycle has been interrupted by ejection of the brew tray 47 or removal of the decanter 12. The brewing LED is shown connected to pin 5 of the multi-pin connector 67.

A low water warning LED 153 (which is shown connected to pin 6 in FIG. 6) lights to warn the user that the system is inoperative due to a low water condition at the flow through coil 33, which is detected by the water level probe connected to pin 14.

A service warning LED 155 illuminates to indicate that the unit requires service. The controller 63 might light this LED, for example, after a predetermined number of brew cycles is initiated and stored in the event counter memory, or when other conditions are detected that indicate that the system is in need of inspection or maintenance. This LED indicates a non-critical condition; the system can be operated while this LED is lit. The service warning LED is shown connected to pin 7 in FIG. 6, with the event counter memory shown connected to pin 21.

A "decanter in place" warning LED 157 lights to indicate that the decanter 12 is not mounted properly in place underneath the coffee maker body. A similar "brew tray in place" warning LED 160 lights to show that the brew tray 47 has been partially ejected or removed completely from the assembly. The decanter in place warning LED is shown connected to pin 8 in FIG. 6, and the brew tray in place warning LED to pin 9.

Pressing a hot water switch 163 on the control panel 13 causes hot water (heated by the flow-through heater) to be delivered by the diverter valve 52 (see FIG. 5) to the water delivery spigot 54 located just to the right of the brew tray 47. Pressing the cold water switch 165 likewise delivers water through the spigot, but in this case the heater is left unpowered as the water flows through the flow coil, so that cold water flows from the spigot.

Pressing a brew tray release button 167 to the left of the brew tray releases a latching mechanism, and the brew tray 47 is partially ejected from the coffee maker by a spring force acting on the brew tray or its mounting mechanism. The brew tray can then be gripped by the user, who can remove it entirely from the assembly.

The decanter 12 is normally secured in place by a latching mechanism inside the system. The user can press a pot release button 170 located underneath the brew tray release 167 to release the latching mechanism so that the decanter can be removed from the coffee maker by the user.

Although presently preferred embodiments of the invention are described above, improvements, modifications and additions may be developed and implemented without departing from the basic principles of the invention. For example, though the invention is described primarily as a system for making coffee, the invention or elements of it might well be adapted to dispense other beverages or other heated liquids for other purposes.

Although the invention is presently contemplated for use onboard aircraft, the same general configurations could find use in other vehicles such as trains and ships and space and military uses as well as any other forms of transportation in which passengers expect coffee service to be available. Usage of this invention could extend to fixed installation usages such as in institutions, schools, prisons' restaurants or cafeterias, and the like.

Exemplary embodiments of coffee maker assemblies and their component parts are described in this document. These are merely examples, though, and the scope of the invention is not limited to these preferred embodiments. The full scope of the invention should be determined instead primarily by reference to the claims that follow, along with the full scope of equivalents to which those claims are legally entitled.

What is claimed is:

1. A coffee maker assembly for use in an aircraft having a galley water supply reservoir and a rail, the assembly comprising:
    a rail water supply connection;
    means for connecting the rail water supply connection to the galley water supply reservoir;
    means, comprising a flow control valve configured as an electrically controlled solenoid valve, for controlling a flow of water from the galley water supply reservoir;
    a heater element configured to receive water from the flow control valve and to heat water flowing through either the heater element or a water conducting element extending generally coextensively with the heater element;
    wherein the flow control valve is located in a conduit between the galley water supply reservoir and the heater element;
    a conduit configured to receive heated water and to direct the heated water into contact with ground coffee;
    a receptacle configured to receive and hold liquid coffee produced by the contact of the heated water with the ground coffee;
    a return conduit distinct from a conduit in which the flow control valve is disposed, wherein water can be drained from the heater element and into the galley water supply reservoir through the return conduit; and
    a system drain check valve in the return conduit and configured to allow water to flow in a direction from the heater element toward the galley water supply reservoir, and to prevent the flow of water in a direction from the galley water supply reservoir toward the heater element.

2. The coffee maker assembly of claim 1, and further comprising a water filter in a conduit between the galley water supply reservoir and the flow control valve.

3. The coffee maker assembly of claim 1, and further comprising a flow rate control valve in a conduit between the galley water supply reservoir and the heater element, wherein the flow rate control valve is operable to enhance the constancy of a water flow rate through the flow rate control valve across a range of pressures in water entering an upstream side of the flow rate control valve.

4. The coffee maker assembly of claim 3, wherein the flow rate control valve is located in a conduit between the flow control valve and the heater element.

5. The coffee maker assembly of claim 1, and further comprising a diverter valve operable to direct water from the heater element alternatively to (a) the conduit configured to receive heated water from the heater element and to direct the heated water into contact with ground coffee, and (b) a water outlet configured to supply water not mixed with coffee from the assembly.

6. The coffee maker assembly of claim 1, wherein the receptacle configured to receive and hold liquid coffee is a decanter that is configured to be received and releasably held by structure of the assembly.

7. The coffee maker assembly of claim 6, and further comprising an electronic sensor operable to determine whether the decanter is in place in the decanter holding structure of the assembly.

8. The coffee maker assembly of claim 7, wherein the electronic sensor is connected to circuitry operable to close the flow control valve in response to a determination by the electronic sensor that the decanter is not in place in the decanter holding structure of the assembly.

9. The coffee maker assembly of claim 1, and further comprising a brew tray configured to received and releasably held by structure of the assembly, wherein the brew tray is configured to receive and hold the ground coffee as the heated water is brought into contact with it.

10. The coffee maker assembly of claim 9, and further comprising an electronic sensor operable to determine whether the brew tray is in place in the brew tray holding structure of the assembly.

11. The coffee maker assembly of claim 10, wherein the electronic sensor is connected to circuitry operable to close the flow control valve in response to a determination by the electronic sensor that the brew tray is not in place in the brew tray holding structure of the assembly.

12. The coffee maker assembly of claim 1 in which the rail water supply connection includes a self-closing valve that closes when the assembly is removed from the rail.

13. The coffee maker assembly of claim 1 in which the connecting means comprises a galley water supply connection allowing the assembly to be disconnected from the galley water supply reservoir if the assembly is removed from the aircraft.

14. A coffee maker assembly for use in an aircraft comprising:
    a flow control valve configured to control a flow of water from a water supply reservoir;

a heater element configured to receive water from the flow control valve and to heat water flowing through either the heater element or a water conducting element extending generally coextensively with the heater element;

wherein the flow control valve is located in a conduit between the water supply reservoir and the heater element;

a conduit configured to receive heated water and to direct the heated water into contact with ground coffee;

a receptacle configured to receive and hold liquid coffee produced by the contact of the heated water with the ground coffee; and a first temperature sensor operable to detect a temperature at an upstream position of the heater element, a second temperature sensor operable to detect a temperature at a position along the heater element, and a third temperature sensor operable to detect a temperature at a downstream position of the heater element.

15. A coffee maker assembly for use in an aircraft comprising:

a flow control valve configured to control a flow of water from a water supply reservoir;

a heater element configured to heat water from the water supply reservoir;

a conduit configured to receive heated water and to direct the heated water into contact with ground coffee;

a receptacle configured to receive and hold liquid coffee produced by the contact of the heated water with the ground coffee;

first and second capacitive elements inside the receptacle;

controller circuitry operable to detect a change in capacitance between the first and second capacitive elements; and a controller operable to close the flow control valve in response to the change detected in the capacitance between the first and second capacitive elements; and wherein the receptacle includes a body member and a removable lid and the first and second capacitive elements are mounted to the removable lid.

16. The coffee maker assembly of claim 15, and further comprising:

a first electrical contact on the exterior of the receptacle and in electrical contact with the first capacitive element; and a second electrical contact on the exterior of the receptacle and in electrical contact with the second capacitive element;

wherein the first and second electrical contacts are in electrical contact with the electronic circuitry operable to detect a change in capacitance between the first and second capacitive elements.

* * * * *